United States Patent
Hommeltoft

(10) Patent No.: US 6,887,442 B2
(45) Date of Patent: May 3, 2005

(54) PROCESS FOR THE DRYING OF A HYDROCARBON STREAM

(75) Inventor: Sven Ivar Hommeltoft, Hillerød (DK)

(73) Assignee: Haldor Topsoe A/S, Lyngby (DK)

( * ) Notice: Subject to any disclaimer, the term of this patent is extended or adjusted under 35 U.S.C. 154(b) by 148 days.

(21) Appl. No.: 10/279,128

(22) Filed: Oct. 24, 2002

(65) Prior Publication Data

US 2003/0091489 A1 May 15, 2003

(30) Foreign Application Priority Data

Nov. 7, 2001 (DK) .......................................... 2001 01651

(51) Int. Cl.[7] .......................... C07C 309/00; B01J 8/00
(52) U.S. Cl. ......................... 423/210; 562/30; 562/115; 562/122; 562/124
(58) Field of Search ........................... 423/210; 562/30, 562/115, 122, 124

(56) References Cited

U.S. PATENT DOCUMENTS

| 4,005,997 A | 2/1977 | Fowler et al. |
| 5,725,637 A | 3/1998 | Goltsin et al. |
| 6,121,486 A | * 9/2000 | Hommeltoft et al. ....... 562/115 |

FOREIGN PATENT DOCUMENTS

| AU | 11321/76 | 9/1977 |
| DE | 26 07 258 | 9/1977 |
| GB | 1426 401 | 2/1976 |
| JP | 6071650 | 3/1994 |

OTHER PUBLICATIONS

J. Burdon et al., "Fluorinated Sulphonic Acids Part 1 Perfluoro–Methane–Octane and Decane–Sulphonic Acids and Their Simple Derivatives", *Journal of the Chemical Society*, Jun. 1957, pp. 2574–2578.

M. Freemantle, "Eyes on Ionic Liquids", *Chemical and Engineering News*, American Chemical Society, vol. 78, May 2000, pp. 37–50.

* cited by examiner

Primary Examiner—Stanley S. Silverman
Assistant Examiner—Jonas N. Strickland
(74) Attorney, Agent, or Firm—Dickstein Shapiro Morin & Oshinsky LLP

(57) ABSTRACT

The invention concerns a process for the continuous drying of a hydrocarbon stream and comprises contacting the hydrocarbon stream with an ionic, liquid drying agent of a salt of a fluorinated sulphonic acid.

2 Claims, 1 Drawing Sheet

PROCESS FOR THE DRYING OF A HYDROCARBON STREAM

Figure 1:
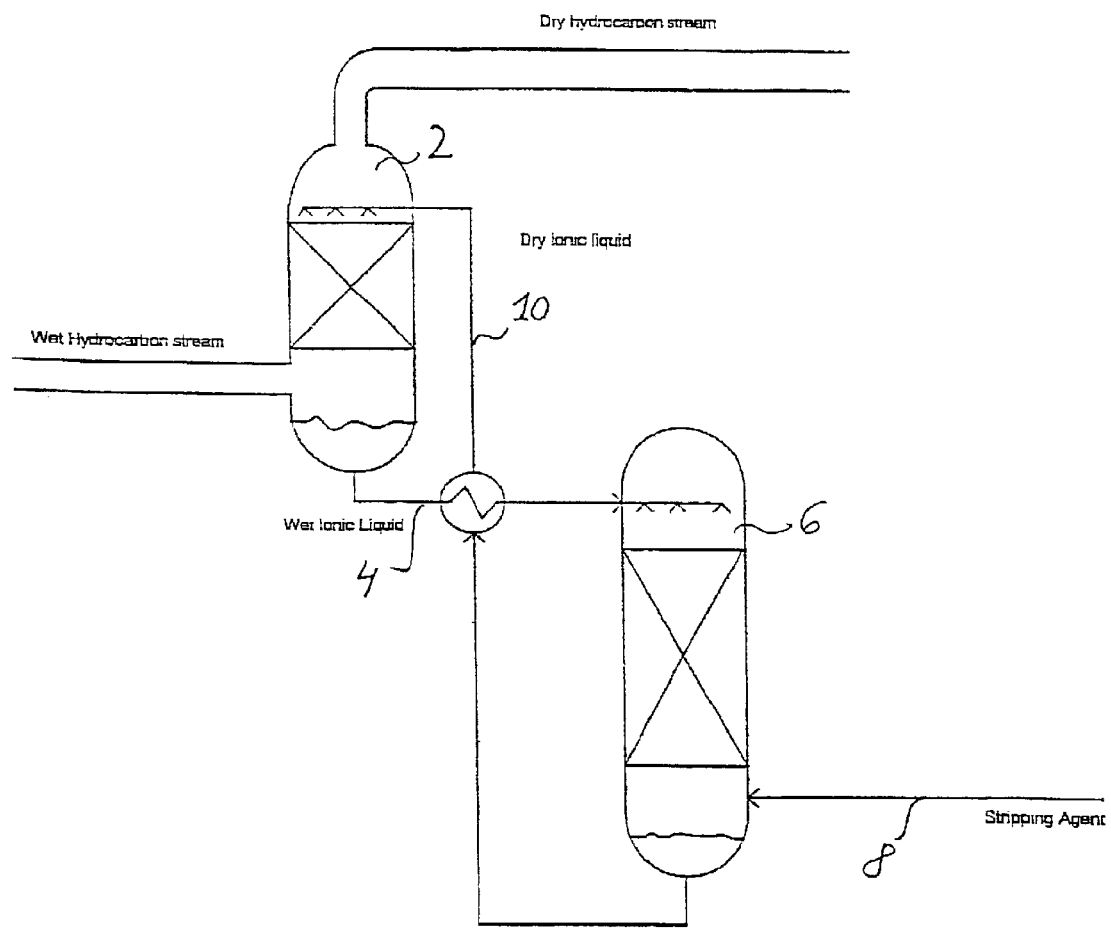

The invention relates to a process for the removal of water from a hydrocarbon stream.

When processing hydrocarbon streams in processes such as isobutane alkylation in which the catalyst is sensitive to water, it is often beneficial to dry the hydrocarbon stream to minimise the effect of the water on the catalyst. Drying of a hydrocarbon stream is typically achieved by passing the stream over a solid absorbent such as alumina or a molecular sieve. Subsequently, the absorbent is dried by heating in a stream of inert gas to a temperature substantially above the temperature of absorption i.e. 250–300° C. This method is effective for reducing water concentrations to less than 10 ppm in the hydrocarbon stream.

The disadvantage of this approach is that both the absorption and desorption is done under substantially different conditions in the same vessel. Consequently, the vessel has to be taken out of drying service for regeneration, thus rendering the operation discontinuous. In addition, the system including the adsorption vessel has to be designed for substantial changes in temperature and occasionally also in pressure, to accommodate the different conditions for drying and regeneration.

Wash of hydrocarbon streams with a saturated solution of a highly soluble salt such as calcium chloride may be used for drying but this method does not dry the hydrocarbon stream efficiently.

Strong acids such as concentrated sulphuric acid are efficient drying agents. However, such materials are too reactive for many drying operations.

SU Patent Application No. 272,465 discloses a process for dehydrating and desalinating petroleum by treatment with a salt of p-cumyl-phenolsulphonic acid. Preferable salts mentioned are sodium, ammonium or diethanolamine salts. These salts tend to be solids under conventional dehydration processes, and solid dehydrating materials are generally placed in the vessel in a fixed bed. The component to be dehydrated then passes through the bed, in a manner similar to the process applied with molecular sieves and solid calcium chloride.

A process for regeneration of a liquid drying agent is disclosed in DE 2607258. However, the drying agent is a glycol, a poly-glycol or an alkanol-amin, and the regeneration of these drying agent comprises several process steps: regeneration in a column, with cooling, condensation, separation of liquid-liquid phases and return of one liquid at top of the column, and with liquid-liquid phase separation, evaporation and return of the liquid to dryer and to regenerator at the bottom of the column.

The process of the invention concerns the extraction of the hydrocarbon stream with a dry ionic liquid. This process provides a convenient and efficient way for continuous drying of a hydrocarbon stream and a simple process for regeneration of the drying agent.

It is an object of the invention to provide a novel process, whereby water is extracted from a hydrocarbon stream.

It is also an object of the invention to provide a continuous process for the extraction of water from the hydrocarbon stream, such that the vessel does not have to be taken out of service for regeneration.

Another object of the invention is to provide a process whereby the vessel to be used does not have to be designed to accommodate different conditions for drying and regeneration.

It is a further object of the invention to provide a dehydrating process using a liquid dehydrating agent and where the liquid drying agent enables the use of a simple process for regeneration of the wet drying agent.

The process of the invention concerns the continuous drying of a hydrocarbon stream by contacting the hydrocarbon stream with an ionic, liquid drying agent of a salt of a fluorinated sulphonic acid.

It is important for the process of the invention that the drying agent is in liquid form. This allows the drying process to take place in the form of an extraction process. The water in the hydrocarbon stream is thus extracted from the stream. This can be done in a counter flow vessel, while simultaneously drying the drying agent in a second operation. This is advantageous since the process does not have to be interrupted for regeneration of the drying agent.

The whole process can thus be performed continuously and in combination with the relatively mild conditions for regeneration, water can be removed from the hydrocarbon stream to very low levels.

A preferred embodiment of the invention is disclosed in FIG. 1. Drying is effectuated in a counter flow column 2 in which the hydrocarbon stream in upwards flow is contacted with the ionic liquid flowing downwards from the top (see FIG. 1). The counter flow ensures an efficient use of the drying agent, allowing for a relatively small flow of drying agent relative to hydrocarbon stream. Wetted ionic liquid is withdrawn in a continuous stream 4 from the bottom of the contact column and dried before being returned to the top of the contact column.

One method of drying the ionic liquid before returning it to the contact column 2 is to strip off water from the ionic liquid in a stripping column 6 as illustrated in the figure.

The following examples illustrate the process of the invention. A stream of heptane containing water is dehydrated using triethyl ammonium triflate. The triflate is then regenerated by stripping it of water using heptane.

EXAMPLE 1

A stream of heptane saturated with water was contacted with a dry, ionic liquid of triethyl ammonium triflate in a counter flow contact column 2 at a temperature of 20° C. in a continuous operation. The ionic liquid was charged through line 10 at a feed rate of 109 g/h to the top of the column and withdrawn at the bottom. The hydrocarbon stream was charged at a feed rate of 3383 g/h to the bottom of the contact column and withdrawn from the top. The contact column was 0.5 m high with an ID=20 mm and packed with 200 ml 4 mm glass helices.

The wetted ionic liquid withdrawn from the contact column 2 was charged to the top of stripping column 6 in which the ionic liquid was dried by stripping in counter flow with a stream 8 of superheated heptane (150° C.) before being withdrawn at the bottom of the stripping column and returned to the top of the contact column. The wet ionic liquid was charged to the top at a feed rate of 109 kg/h at ambient temperature and the dried ionic liquid was withdrawn from the bottom of the stripping column and returned to the hydrocarbon contact column.

Heptane vapour was fed to the stripping column at 1140 g/h. The stripping column was 0,4 m high with ID=30 mm and filled with 300 ml 4×4 mm stainless steel Rashig rings.

The results are given in Tables 1 and 2 below.

TABLE 1

| Contact Column (Hydrocarbon drying) | |
|---|---|
| Hydrocarbon flow (feed, g/h) | 3383 |
| Ionic liquid flow, (g/h) | 109 |
| Before treatment (Wet hydrocarbon feed, ppm water) | 80 |
| After treatment (Dry hydrocarbon product, ppm water) | 5.5 |
| Hydrocarbon feed temperature (° C.) | 20 |
| Ionic liquid feed temperature (° C.) | 20 |
| Hydrocarbon/Ionic liquid rate | 31 |

The results show that the water content in the hydrocarbon feed is reduced from 80 ppm to 5.5 ppm.

TABLE 2

| Stripping Column (Ionic liquid drying) | |
|---|---|
| Ionic liquid flow, (g/h) | 109 |
| Heptane flow, (g/h) | 1140 |
| Before treatment (Wet ionic liquid, ppm water) | 2632 |
| After treatment (Dried ionic liquid, ppm water) | 198 |
| Ionic liquid feed temperature (° C.) | Ambient |
| Heptane feed temperature (° C.) | 98 |

EXAMPLE 2

This experiment was performed in the same equipment as used for Example 1. However, the flows were changed, as illustrated in Tables 3 and 4 below, to give a hydrocarbon flow/ionic liquid flow ratio of 4 in the contact column. The actual flows are shown in the Tables.

TABLE 3

| Contact Column (Hydrocarbon drying) | |
|---|---|
| Hydrocarbon flow (feed, g/h) | 1609 |
| Ionic liquid flow, (g/h) | 409 |
| Before treatment (Wet hydrocarbon feed, ppm water) | 76 |
| After treatment (Dry hydrocarbon product, ppm water) | 3.5 |
| Hydrocarbon feed temperature (° C.) | 20 |
| Ionic liquid feed temperature (° C.) | 20 |
| Hydrocarbon/Ionic liquid rate | 4 |

The results indicated in Table 3 show that the water content in the hydrocarbon stream was reduced from 76 ppm to 3.5 ppm.

TABLE 4

| Stripping Column (Ionic liquid drying) | |
|---|---|
| Ionic liquid flow, (g/h) | 409 |
| Heptane flow, (g/h) | 1140 |
| Before treatment (Wet ionic liquid, ppm water) | 217 |
| After treatment (Dry ionic liquid, ppm water) | 88 |
| Ionic liquid feed temperature (° C.) | Ambient |
| Heptane feed temperature (° C.) | 98 |

What is claimed is:

1. Process for the continuous drying of a hydrocarbon stream comprising the steps of:
   (a) contacting the hydrocarbon stream with a dried form of an ionic, liquid drying agent of a liquid salt of a fluorinated sulphonic acid;
   (b) providing the drying agent in a wet form by continuously removing water from the hydrocarbon steam; and
   (c) removing water from the drying agent in the wet form to obtain the dried form of the drying agent for use in step (a).

2. Process according to claim 1, wherein the salt of the fluorinated sulphonic acid is a trialkylammonium salt.

* * * * *